(12) United States Patent
Uhlhorn (10) Patent No.: US 7,684,695 B1
(45) Date of Patent: *Mar. 23, 2010

(54) OPTICAL DIAGNOSTIC INDICATOR

(75) Inventor: Brian L. Uhlhorn, St. Paul, MN (US)

(73) Assignee: Lockheed Martin Corporation, Bethesda, MD (US)

(*) Notice: Subject to any disclaimer, the term of this patent is extended or adjusted under 35 U.S.C. 154(b) by 798 days.

This patent is subject to a terminal disclaimer.

(21) Appl. No.: 11/503,033

(22) Filed: Aug. 11, 2006

(51) Int. Cl.
*H04B 10/08* (2006.01)

(52) U.S. Cl. ............... 398/10; 398/17; 398/9; 398/13; 398/20; 398/25; 398/30; 398/31; 398/33

(58) Field of Classification Search .......... 398/1–38; 385/13–74; 359/154, 333, 892
See application file for complete search history.

(56) References Cited

U.S. PATENT DOCUMENTS

| 4,068,952 | A |   | 1/1978  | Erbert et al. |
| 4,310,217 | A | * | 1/1982  | de Mendez et al. ......... 359/333 |
| 4,664,732 | A |   | 5/1987  | Campbell et al. |
| 4,848,999 | A | * | 7/1989  | Taylor ................... 65/407 |
| 5,109,443 | A | * | 4/1992  | Hill et al. ................. 385/13 |
| 5,432,875 | A |   | 7/1995  | Korkowski et al. |
| 5,450,192 | A |   | 9/1995  | Nolf et al. |
| 5,523,837 | A | * | 6/1996  | Prozzo ................... 356/218 |
| 5,801,892 | A | * | 9/1998  | Naganuma et al. ......... 359/892 |
| 5,965,877 | A |   | 10/1999 | Wood et al. |
| 6,307,998 | B2 |  | 10/2001 | Williams Vigliaturo |
| 6,445,856 | B1 | * | 9/2002 | Yang .................... 385/48 |
| 7,245,800 | B1 | * | 7/2007 | Uhlhorn ................. 385/24 |
| 2002/0024703 | A1 | * | 2/2002 | Lee et al. ................ 359/154 |
| 2003/0021543 | A1 | * | 1/2003 | Mann et al. .............. 385/74 |
| 2003/0039457 | A1 |   | 2/2003 | Holmquist |
| 2004/0044489 | A1 | * | 3/2004 | Jones et al. ............... 702/79 |
| 2005/0286043 | A1 |   | 12/2005 | Weinert et al. |
| 2007/0019960 | A1 | * | 1/2007 | Kuwata et al. ............ 398/118 |

FOREIGN PATENT DOCUMENTS

JP  06-232842  * 8/1994
JP  2003-264509 * 9/2003

* cited by examiner

*Primary Examiner*—Li Liu
(74) *Attorney, Agent, or Firm*—Brooks, Cameron & Huebsch, PLLC (57) ABSTRACT

One apparatus embodiment includes a first light source, a second light source, and a receiver having a photodetector. The first light source emits a first signal at a nonvisible wavelength for data transmission. The second light source emits a second signal at a visible wavelength for fault detection when combined with the first signal for transmission over a fiber optic path. The receiver converts the first signal from the nonvisible wavelength to an electrical signal.

32 Claims, 9 Drawing Sheets

OPTICAL DIAGNOSTIC INDICATOR

FIELD OF THE INVENTION

The present disclosure generally relates to fault detection and location in optical networks. And, in particular, the present disclosure relates to fault location in fiber optical pathways, and other such fields.

BACKGROUND

In optical fiber communications, optical fibers are often constructed from a number of sections each having an optical pathway formed therein. The sections are aligned end to end such that light passing through a first optical pathway section can continue traveling through the optical pathway of a second optical fiber section.

In theory, the ends are placed adjacent to each other and the light passes from one end to the next. However, in the field, the environment of the optical network can provide forces that move one optical fiber section with respect to another and, thereby, the transmission of light signals between the optical fiber sections can be attenuated or disrupted. Alternatively, or in combination with the just-described movement, "dirt" from the environment can contaminate one end and/or the other end of two adjacent optical fiber sections so as to attenuate or disrupt transmission of light signals. As such, typically, at least the ends of two adjacent optical fiber sections are connected to each other in a manner (e.g., with an optical connector) intended to maintain the alignment and/or prevent the contamination of the optical pathway with respect to the two optical fiber sections.

In some instances, an optical fiber is analyzed to determine if a disconnect in the optical pathway exists and/or where the disconnect is located. For example, in some instances, it may be that the location of a fault within an optical fiber is to be located so the fault can be rectified.

Oftentimes, this is accomplished by disconnecting the optical fiber from a transmitter, connector, and/or receiver so that the optical pathway of the optical fiber can be tested. The testing typically involves attaching an end of an optical fiber to a separate testing apparatus.

Optical Time-Domain Reflectometry (OTDR) is one method used to locate such faults (e.g., disconnect in the fiber) in fiber optic networks. In this method, a laser pulse is sent down a fiber to be tested and reflected back by a fault in the optical pathway. The reflected laser pulse is then received by a photodetector. The time period elapsed since the signal was sent indicates how far down the pathway the fault is located.

However, the use of a separate testing apparatus to locate faults within an optical fiber can be time consuming and costly. In order to test the optical pathway, the testing equipment can be connected via a fiber access point which adds components to the optical network and can degrade the signal as it travels along the optical pathway. Alternatively, in systems where optical pathways forming an optical network are constructed using a number of optical fibers, each forming a section of the pathway, an end of an optical fiber section can be located and disconnected from the optical network.

In such systems, each optical fiber section is attached to the end of another optical fiber section. In some embodiments, an end of one of the optical sections can be accessed and the testing apparatus can be connected thereto.

Such methods can result in periods where the fiber is out of the communications network and, therefore, can result in network downtime. However, the use of a separate testing apparatus to locate faults within an optical fiber can be time consuming and costly.

SUMMARY

Various embodiments of the present disclosure provide a diagnostic indicator apparatus for optical fault identification and location that can be provided in a fiber optic pathway. For example, diagnostic indicator apparatus embodiments can be provided in a transmitter, receiver, and/or other network component, or as a separate component connected to the network, so that the fiber can remain connected to the communications network while transmitting optical data signals.

In such embodiments, a separate testing apparatus for locating faults within an optical fiber need not be utilized. Embodiments of the present disclosure can also be used as separate testing apparatuses.

In various embodiments, an optical transmitting and receiving apparatus includes an optical emitter and a photodetector. The emitter can be positioned to emit a light wave through an optical pathway.

Emitters can be of various types, but generally speaking, emitters as used herein are components that emit light. These components can be used to communicate information, such as by pulsed light, changing frequency and/or wavelength, changing intensity, and other methods.

Communication of information (e.g., data) is performed using a laser as a light source in some embodiments. Examples of such laser emitters include a Mode-Locked Laser, a Vertical Cavity Surface Emitting Laser (VCSEL), a Fabry-Perot Laser, and a Distributed Feedback Laser, among others.

A photodetector can be positioned to receive a reflected light wave directed toward the photodetector through the optical pathway. Photodetectors can also be of various types, but, generally speaking, photodetectors are components that detect light that contacts a surface of the photodetector. One example of a suitable type of photodetector is a p-i-n (positive, intrinsic, and negative) photodiode, while another suitable type is a Resonant Cavity Photodetector (RCPD), among others.

The photodetector can be designed and positioned to receive a reflected light wave (e.g., pulse) that was emitted by the emitter and reflected somewhere along the optical pathway. The reflection can be caused by a break, a crack, a bend, a connection point between sections of optical fiber, or dirt along the optical pathway, among other fault sources. In this way, the reflected light wave includes at least a portion of the emitted light wave created by the emitter.

In various embodiments, the photodetector can be positioned to receive a test pulse from an emitter located at another position along the optical pathway. Such embodiments can be used, for example, to identify whether a fault is present between the emitter and photodetector.

Embodiments of the present disclosure can also be used to measure the light intensity received by a photodetector relative to power output by the emitter. Based upon a known reflectivity for a known emitted light output power, the received reflected light wave can be compared to adjust, for instance, the power output, the sensitivity of the detector, and/or other such parameters of the optical system and/or network. Moreover, reduction of received light intensity, for example, to a level inadequate for optimal signal data conversion, can indicate existence of a fault in the optical pathway as the term fault is used herein.

Detection of a fault through evaluation of a received optical signal can trigger diagnostic evaluation of a location of the fault. In various embodiments of the present disclosure, detection through optical windows in a fiber optic pathway of visible light signals transmitted by an emitter in conjunction with the optical data signals can be used for approximate localization of a fault.

The emitter and photodetector, in the various embodiments of the present disclosure, can be separate components or can be integrated into a single component. Further, the emitter and photodetector can be manufactured using the same process and can be manufactured as a single component.

In various embodiments, a logic component can be provided with or associated with the emitter, the optical pathway, and/or the photodetector. In some embodiments, the logic component can be used for diagnosing an approximate location of a fault by analysis of characteristics of visible light signals (e.g.; directed through one or more optical windows) and/or optical data signals. The logic component can be provided separately or integrated with the emitter and/or photodetector.

The functions discussed above can be accomplished in various manners. For example, the functions can be accomplished by circuitry and/or by having a processor and memory within or attached to the optical system. Computer executable instructions can be provided in the memory and executable by the processor, for example, to communicate with the emitter and/or photodetectors, either positioned along the optical pathway or at the receiver, to obtain information about the emission, transmission, and/or receipt of visible light and/or optical data signals.

DETAILED DESCRIPTION

The present disclosure includes a number of apparatus, optical pathway, and method embodiments for transmitting, evaluating, and/or receiving light waves. Embodiments of the present disclosure will now be described in relation to the accompanying drawings, which will at least assist in illustrating the various features of the various embodiments.

Figure 1:
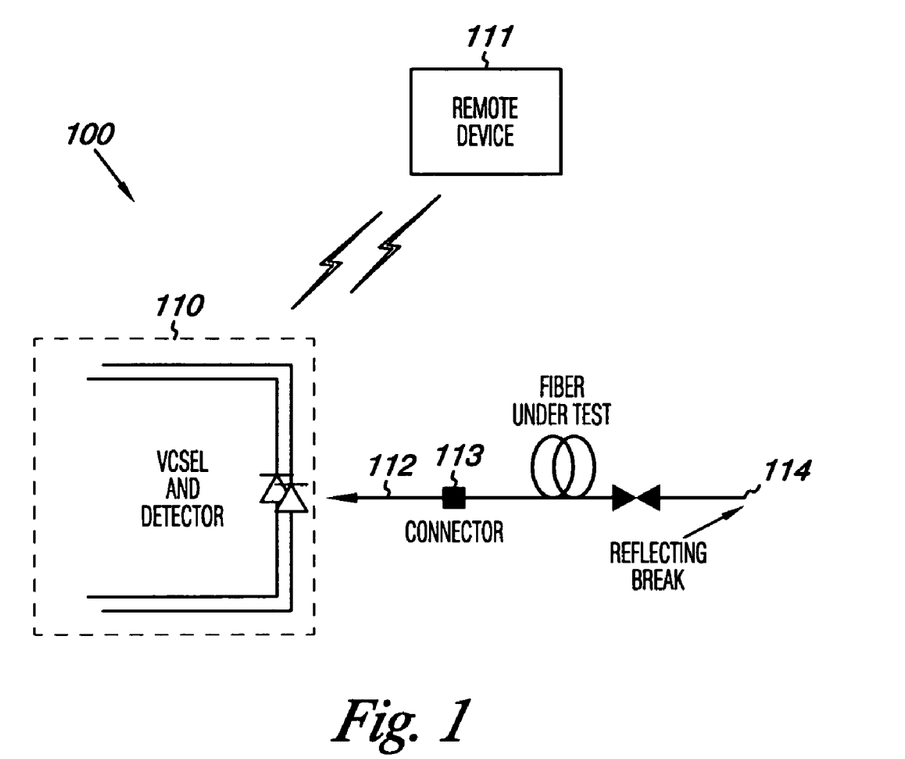
FIG. 1 is an illustration of an embodiment of an optical network in accordance with the present disclosure.

FIG. 1 is an illustration of an embodiment of an optical network in accordance with the present disclosure. The embodiment shown in FIG. 1 illustrates an optical system 100 has an integrated emitter and detector 110 (e.g., a VCSEL as the emitter and a photodetector, such as a photodiode, as the receiver). The emitter and detector component 110 is positioned to send and receive light waves via an optical path within an optical fiber 112.

The optical fiber may be made up of a number of optical fiber sections that are connected end to end by a number of connectors. In the embodiment shown in FIG. 1, the fiber under test 112 has two sections connected by a connector 113 and has a reflecting break 114.

The reflecting break 114 can be any type of fault that would reflect light back toward the detector. For example, the fault can be a defect in the optical fiber, a break in the optical pathway, a bend or kink in the fiber, the end of a first optical fiber section having a contaminated engagement surface interfering with transmission of light to an engagement surface of a second optical fiber section, or other such reflection or non-reflection source.

In some embodiments, the reception of light can be the indicator of a functional or non-functional pathway (e.g., light travels through the pathway and a return signal is sent, from either reflected light or generated at the receiving end of the pathway to the signal emitting end of the pathway, to verify the receipt of a signal. As stated herein, some faults can also reflect light and can be used as an indicator. In some embodiments, the absence of light can be the indicator.

In the embodiment shown in FIG. 1, the emitter 110 emits a light signal that is directed at an end of the optical pathway of optical fiber 112. In various embodiments, one or more integrated lenses and/or integrated partially reflective beam splitters can be positioned between the emitter and the end of the optical path. The lenses and/or beam splitters can be used to focus and/or direct light signals to the end of the optical pathway (e.g., a receiver with a photodetector). Such components can be integrated into the optical fiber thereby reducing the number of components if the system and the potential for contamination, among other benefits.

As stated above, an optical emitter, optical pathway, and/or photodetector component can be connected to a logic component that can be used to determine characteristics of light detected at various points in the optical pathway. The logic component can be circuitry provided within or associated with the emitter, pathway, and/or detector component or a processor within or associated with one or more of the components. Once information is received from the emitter, the pathway, and/or detector component, the information can be compared to thresholds and/or to information stored in memory to identify whether a fault is present.

The logic component can also be resident on a remote device (e.g., remote device 111) that is not part of the optical system or network. For example, a logic component can be resident on a personal, mainframe, or server type computer, which, in some embodiments, can be a portable device. Further, the communication of information from the emitter, the pathway, the detector, and/or the logic component to a remote device can be accomplished in a wired or wireless manner.

Among various possible functions, the embodiments of the present disclosure that are described in relation to the following drawings can assist in diagnosing a fault in transmission of optical signal data along an optical fiber and in diagnosing an approximate location for the fault along the optical pathway. Moreover, various embodiments have been designed to enable detection and location of the fault while allowing for uninterrupted transmission of optical signals containing information (e.g., data) that can be converted to electrical signals.

In general, diagnosis of the presence of a fault and its location can be performed using a visible light wavelength as an indicator. Such a signal can be transmitted as a combined signal with a nonvisible wavelength for data transmission over a fiber optic path. Evaluation of characteristics of at least a portion of the visible light directed through at least one optical window in the optical pathway, such as by an operator or a photodetector linked to a logic component, can enable detection of the fault and determination of an approximate location of the fault during active communication of information over the fiber optic network.

Figure 2:
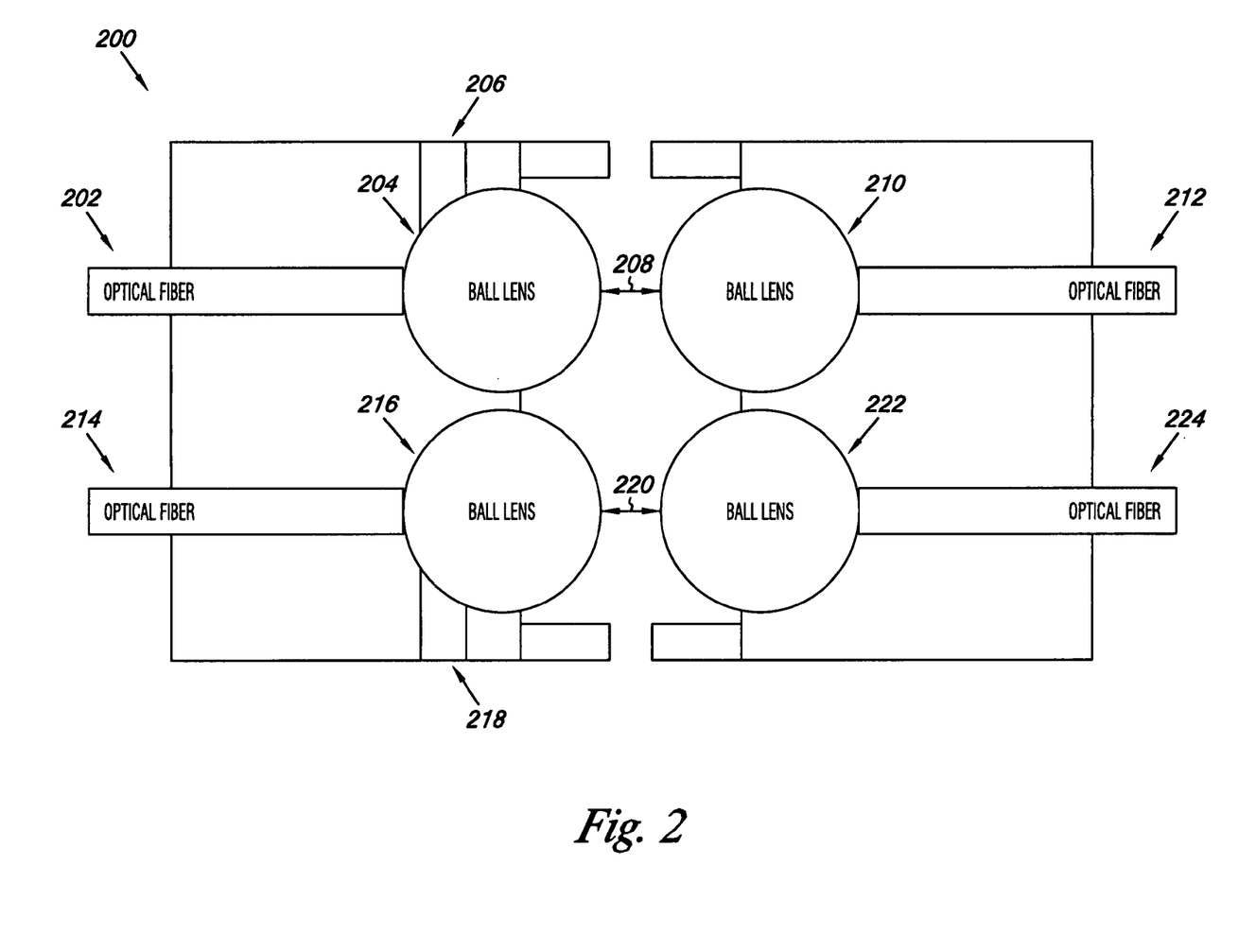
FIG. 2 is an illustration of an expanded beam type optical connector in accordance with an embodiment of the present disclosure.

FIG. 2 is an illustration of an expanded beam type optical connector in accordance with an embodiment of the present disclosure. In the embodiment illustrated in FIG. 2, an optical connector apparatus 200 is shown that can be used for diagnosing a fault location along a fiber optic pathway. A connector, such as the embodiment shown in FIG. 2, can enable coupling of two optical fiber sections whether they are a single mode type fiber or a multimode type fiber.

In general, fiber optic connectors are used to enable transmission of light pulse signals carrying information from an end of one fiber optic section (e.g., an engagement surface) to an end of another fiber optic section. Such connectors can provide benefits such as providing a secure connection, a stable connection, and/or a connection that protects the engagement surfaces of the fibers within the two optical fiber sections from contamination.

However, one or more faults can occur within a connector or along the optical pathway. Such faults can reduce the efficiency of signal transmission, for example, by dislocation of one or both optical fiber sections, by contamination of one or more engagement surfaces of fibers, or by other causes. Additionally, a fault can occur in the optical fiber pathway between connectors that results from breakage of an optical fiber section, a bend or kink that interferes with internal reflection of light, or other such causes.

Diagnosing a presence of such a fault and/or a location thereof by evaluating characteristics of light signals being transmitted, such as in an uninterrupted stream of pulses, carrying information through the optical fiber pathway, including the connectors, can be facilitated by including optical windows in the optical fiber pathway that enable observation of the status of light transmission therethrough. One suitable position for inserting an optical window into an optical fiber pathway is in association with a connector of two optical fiber sections because there is already a separation between engagement surfaces of optical fibers associated with such a connector.

The embodiment of the connector 200 illustrated in FIG. 2 shows a first optical fiber section 202 leading into a left portion of the connector 200 until the optical fiber section 202 reaches a first lens 204, which is shown in FIG. 2 as a ball lens. A lens, such as that shown in the embodiment of FIG. 2, can allow light to enter from the optical fiber section 202 to the first lens 204 by being attached to the optical fiber section 202, by being closely adjacent to the optical fiber section 202, by being an integral part of the structure of the optical fiber section 202, or by other arrangements. A ball lens is an expanded beam type lens because beams of light of particular wavelengths tend to expand in area during passage through such a lens. Hence, an optical connector employing one or more of such a lens (e.g., a ball lens) can, in some instances, be referred to as an expanded beam type optical connector.

An optical window 206 is illustrated in the embodiment of the optical connector 200 shown in FIG. 2. The first optical window 206 can allow passage of at least a portion of the light transmitted from the first optical fiber section 202 to the first lens 204. An optical window can be an unfilled portal in the structure of the connector 200, or the optical window can be formed from a material that is at least partially transparent or translucent, so long as at least a portion of light directed toward the optical window by the lens can be detected outside the connector 200. Optical windows 206, 218 are only shown on the left side of the optical connector 200, however, one or more optical windows can be associated with each lens on both sides of a connector.

In the embodiment of FIG. 2, optical signals can be transmitted from the left side of the optical connector 200 by passage through the first lens 204 (e.g., a first ball lens) across a first aperture 208 to a second lens 210 (e.g., a second ball lens) positioned on the right side of the connector 200. A lens as used in the present disclosure can transmit light across a space (e.g., an aperture) whether or not the light has been focused or unfocused, such as by diffraction, reflection, or some other means.

Additionally, two lenses transmitting optical signals between them do not have to be directly opposed to each other, as shown in FIG. 2. For example, the lenses participating in optical signal transmission can be positioned at any angle or distance that allows signal transmission between the lenses.

In the embodiment shown in FIG. 2, the second lens 210 can allow passage of at least a portion of the light transmitted by the first lens 204 to a second optical fiber section 212, as illustrated on the right side of the connector 200, which can allow further transmission of optical signals along the optical pathway. An optical connector 200, as illustrated in FIG. 2, can have multiple optical fibers associated with each side of the connector. For example, a third optical fiber section 214 can be inserted, as shown in the embodiment of FIG. 2, into the left side of the connector 200 so that the optical fiber section 214 transmits optical signals through a third lens 216 (e.g., a third ball lens).

At least a portion of the light transmitted as an optical signal through the third lens 216 can be directed through a second optical window 218 for detection outside the connector 200. A remainder of the optical signal can be transmitted across a second aperture 220 to a fourth lens 222, as shown on the right side of the connector 200 in the embodiment of FIG. 2. After passage through the fourth lens 222, at least a portion of the optical signal can be directed toward a fourth optical fiber section 224 for continued transmission along the optical pathway.

In some embodiments, one of the optical pathways (e.g., fiber sections 202 and 212 or sections 214 and 224) can have a window for detection while the other pathway does not. Furthermore, in some embodiments, each fiber section (e.g., 202, 212, 214, and 224) can have a window associated therewith. Such embodiments, can identify if there is a problem at the connector, among other benefits.

Optical signals have been described as being transmitted in one direction (i.e., left to right) in the embodiment of FIG. 2 for the purpose of clarity. However, optical signals can be transmitted in either direction by the lens arrangement illustrated. Moreover, optical signals carrying distinct information can be transmitted in both directions along the same optical fiber either alternately or simultaneously.

Figure 3:
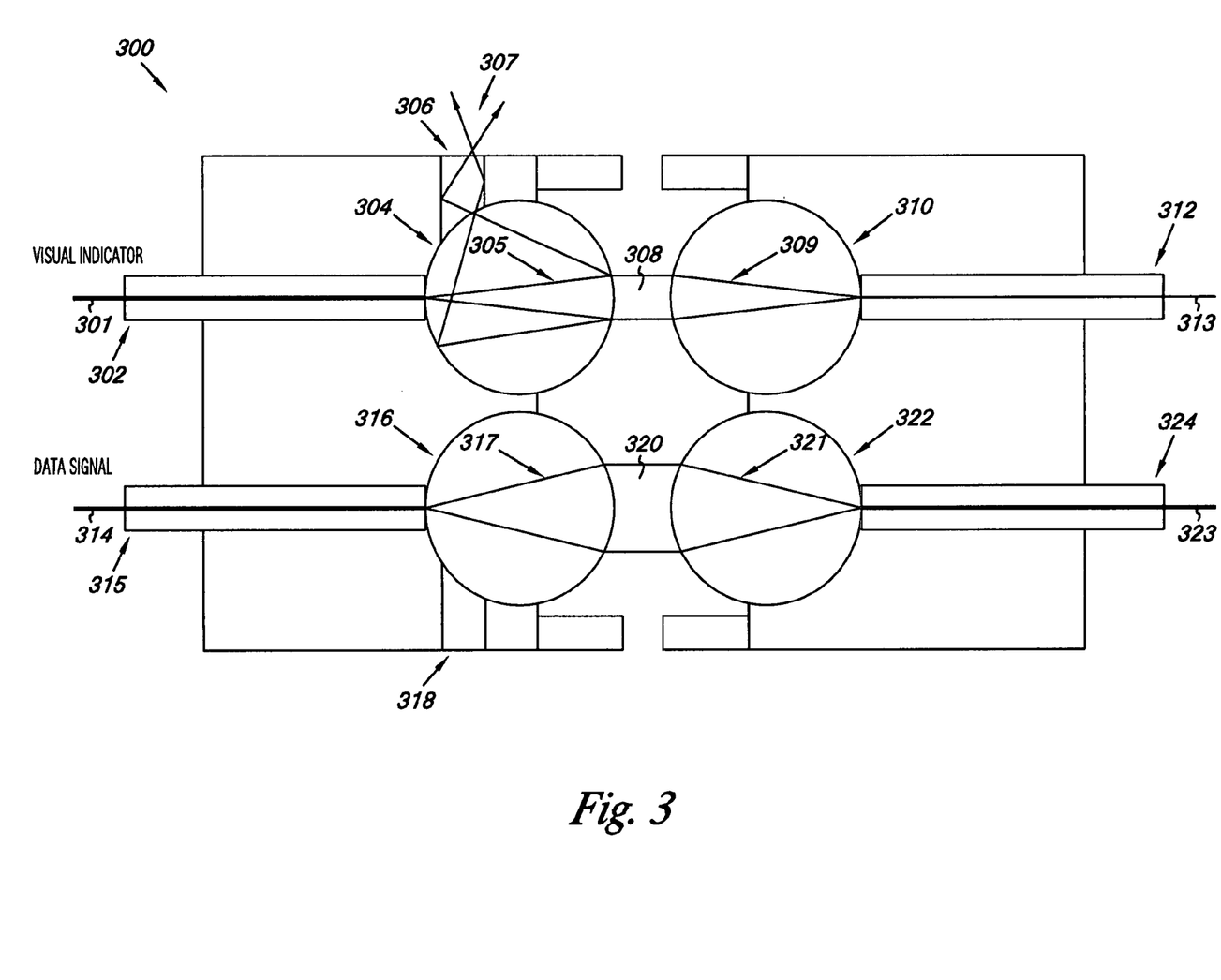
FIG. 3 is an illustration of operation of an expanded beam type optical connector in accordance with an embodiment of the present disclosure.

FIG. 3 is an illustration of operation of an expanded beam type optical connector in accordance with an embodiment of the present disclosure. In the embodiment illustrated in FIG.

3, an optical connector apparatus 300 is shown that is similar to the embodiment of the connector apparatus shown in FIG. 2. The connector 300 in the embodiment of FIG. 3 has a first optical signal 301 that is transmitted through an indicator optical fiber 302 toward a first lens 304, which is a first ball lens.

In the embodiment of FIG. 3, the first optical signal 301 can come from a first light source. In various embodiments, the light source emits a visible light (e.g., having a wavelength or a range of wavelengths perceptible by the human eye), for example, having a wavelength or wavelengths in a range of around 480 to around 650 nanometers. The optical signal 301 can be a continuous beam of light, a rapidly pulsed emission of light, a more intermittent pattern of light emission, a combination thereof, or other emission pattern.

In the embodiment of FIG. 3, when the optical signal 301, transmitted through the visual indicator optical fiber 302, reaches the first ball lens 304, the optical signal 301 can enter the first ball lens 304. During and after entry, properties of the light wavelength and/or properties of the composition, curvature, coating, etc., of the first ball lens can cause the beam of the optical signal 301 to expand 305.

The properties of the light wavelength and/or the ball lens 304 can cause at least a portion of the optical signal 301 to be reflected 305 inside the ball lens 304 such that at least a portion of the reflected optical signal is directed toward a first optical window 306. As shown in the embodiment of FIG. 3, at least a portion of the reflected optical signal 305 directed toward the first optical window 306 can pass through to the outside of the optical connector 300. The light 307 that has passed through the first optical window 306 can be detected outside the connector 300 by an operator and/or a photodetector.

A remainder of the optical signal that has not been internally reflected in the first ball lens can exit and pass across an aperture 308 and the remaining optical signal 309 can enter a second lens 310 (e.g., a second ball lens such as shown in the embodiment of FIG. 3). The remaining optical signal 309 can be directed by the second lens 310 (e.g., by being focused to reverse the expansion of the visible beam as shown in the embodiment of FIG. 3) to a second indicator optical fiber 312, through which a reformed optical signal 313 can be transmitted along the optical pathway.

In the embodiment illustrated in FIG. 3, the optical connector apparatus 300 has a second optical signal 314 that is transmitted through a data signal optical fiber section 315 toward a third lens 316, which in this embodiment is shown as a third ball lens. The second optical signal 314 can be comprised of light pulses conveying information (e.g., data) along the optical pathway.

In various embodiments, the second optical signal can come from a second light source emitting light, which in some embodiments can be nonvisible light having a wavelength or a range of wavelengths imperceptible by the human eye that is emitted by a laser (e.g., a Mode-Locked Laser, a Vertical Cavity Surface Emitting Laser (VCSEL), a Fabry-Perot Laser, and a Distributed Feedback Laser, among others). In some embodiments, the nonvisible light of the second signal 314 can have a wavelength or wavelengths selected from around 850, 1310, and/or 1550 nanometers.

In the embodiment of FIG. 3, when the second signal 314, transmitted through the normal data signal optical fiber section 315, reaches the third ball lens 316, the second signal 314 can enter the third ball lens 316. During and after entry, properties of the second signal wavelength and/or properties of the composition, curvature, coating, etc., of the third ball lens can cause the light beam of the second signal 314 (e.g., a nonvisible wavelength) to expand 317. The properties of the second signal 314 wavelength and/or the ball lens 316 can cause the second signal 314 to be refracted 317 inside the ball lens 316 to such an extent that little of the second signal 314 is internally reflected. As such, in the embodiment illustrated in FIG. 3, none of the refracted light 317 is shown to be reflected and directed toward a second optical window 318, which would make the second signal 314 substantially undetectable through the second optical window 318.

The angle of refraction 317 of the second signal 314 can allow a portion of the second signal 314 to be transmitted across an aperture 320 where the second signal 321 enters a fourth ball lens 322 shown in the embodiment of FIG. 3. In some embodiments, the fourth ball lens 322 can focus the second signal 321 to reverse the expansion of the second signal 317 to a reformed second signal beam 323 in a second data signal optical fiber section 324 for transmission along the optical pathway.

The embodiment illustrated in FIG. 3 shows the visible first signal 301 and the normal data second signal 314 to be transmitted through two separate optical fiber sections 302, 315 for purposes of clarity. However, in some embodiments, the first and second signals can be transmitted as a combined signal over a single fiber optic pathway.

In various embodiments, a first light source can emit a first signal at a visible wavelength for fault detection, a second light source can emit a second signal (e.g., at a nonvisible wavelength) for data transmission, where the first signal and the second signal can be transmitted as a combined signal over the fiber optic path. In an embodiment such as that shown in FIG. 3, a receiver having a photodetector (e.g., a photodiode) can convert the second signal (e.g., from the nonvisible wavelength) to an electrical signal.

In various embodiments, the fiber optic path can include a multimode fiber for transmitting the first signal and the second signal. In some embodiments, the transmitter can include a Light Emitting Diode (LED) as the first light source. In various embodiments, a transmitter can produce a combined signal including the first signal and the second signal. In some embodiments, the transmitter is a single unit serving as both the first light source and the second light source.

In various embodiments, the receiver can include a filter to discriminate the first signal from the second signal. In some embodiments, the filtering can be accomplished prior to reception of the second signal by the photodetector. The filter, in various embodiments, can be selected from a group including a reflective thin film filter, an absorptive thin film filter, and a wavelength dependent beam split filter, among others. A filter can also be an electrical filter that filters the electrical signals generated by the different optical signals.

Figure 4:
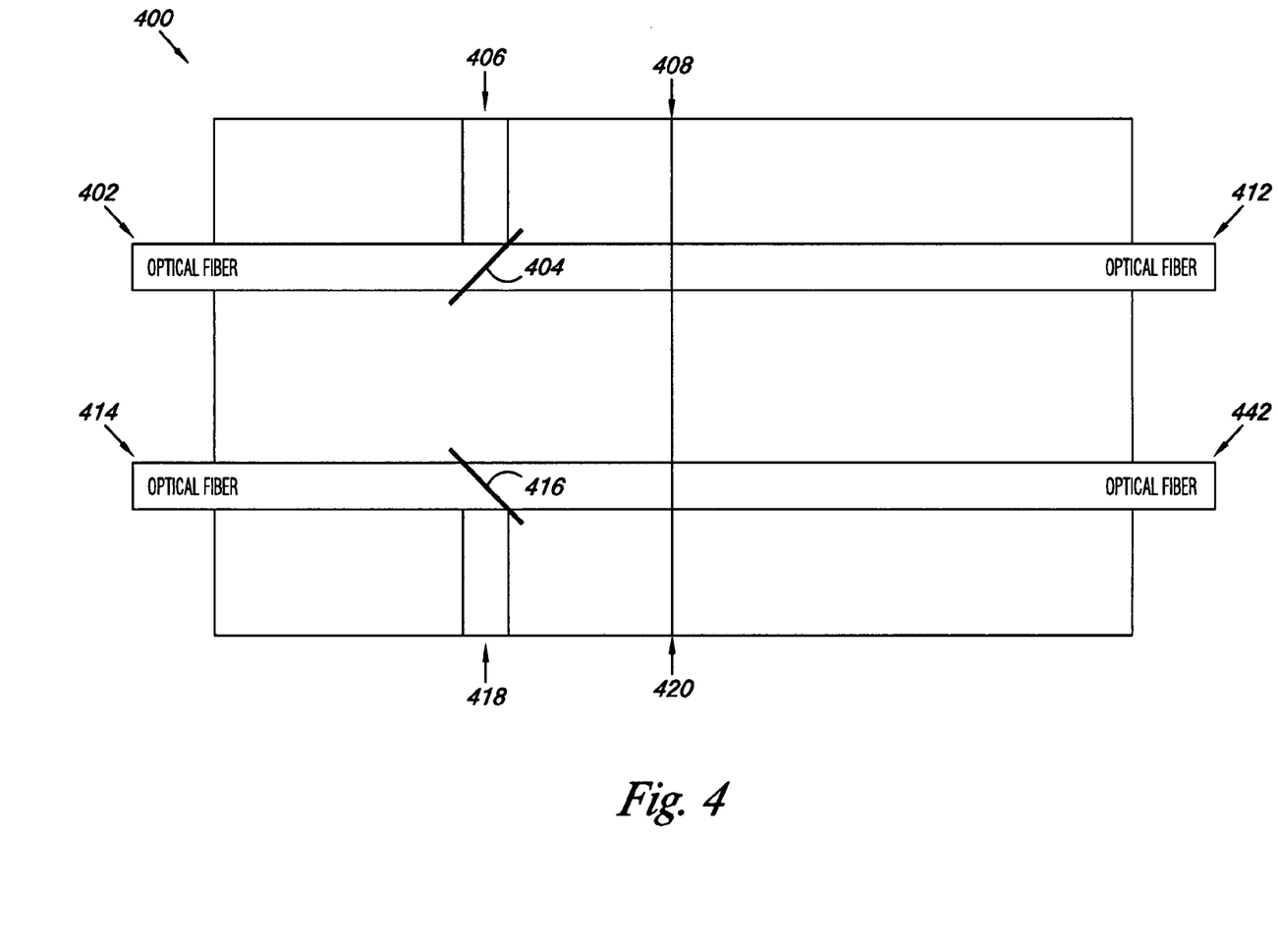
FIG. 4 is an illustration of a reflective type optical connector in accordance with an embodiment of the present disclosure.

FIG. 4 is an illustration of a reflective type optical connector in accordance with an embodiment of the present disclosure. In the embodiment illustrated in FIG. 4, an optical connector apparatus 400 is shown that can be used for diagnosing a fault location along a fiber optic pathway. A connector 400 such as that shown in FIG. 4 can enable coupling of two optical fiber sections whether they are of a single mode type fiber or multimode type fiber.

The embodiment of the connector 400 illustrated in FIG. 4 shows a first optical fiber section 402 leading into a left portion of the connector 400 until the optical fiber section 402 reaches a reflective type optical element 404. The reflective type optical element 404 can be a filter selected from a group including a reflective thin film filter, an absorptive thin film filter, and a wavelength dependent beam split filter, among others. The filter comprising the reflective type optical element 404 can be constructed such that the filter reflects at least a portion of incident light of a particular first wavelength, or in a particular first range of wavelengths, and allows substantially undiminished transmission of a particular second wavelength of incident light, or a particular second range of wavelengths. An angle of reflection of the reflective type optical filter can be dependent upon the angle of incident light relative to the surface of the reflective type optical filter or it can be determined in another manner.

An optical window 406 is illustrated in the embodiment of the optical connector 400 shown in FIG. 4. The first optical window 406 can allow passage of at least a portion of the light reflected by the first reflective type optical element 404.

An optical window can be an unfilled portal in the structure of the connector 400, or the optical window can be formed from a material that is at least partially transparent or translucent, so long as at least a portion of light directed toward the optical window by the lens can be detected outside the connector 400. In some embodiments, the window can be opaque in the visible spectrum, but can be transparent to non-visible wavelengths. Optical windows 406, 418 are only shown on the left side of the optical connector 400, however, one or more optical windows can be associated on the right side or both sides of a connector.

In the embodiment of FIG. 4, optical signals can be transmitted from the left side of the optical connector 400 by passage through the first reflective type optical element 404 across an interface 408 and into a right side of the optical connector 400 for continued transmission along an aligned optical path in a second optical fiber section 412 in the right side of the optical connector 400.

An optical connector 400, as illustrated in FIG. 4, can have multiple optical fiber sections associated with each side of the connector. For example, a third optical fiber section 414 can be inserted, as shown in the embodiment of FIG. 4, into the left side of the connector 400 so that the third optical fiber section 414 transmits optical signals through a second reflective type optical element 416.

At least a portion of the first wavelength of light transmitted as an optical signal and incident on the second reflective type optical element 416 can be directed through a second optical window 418 for detection outside the connector 400. In some embodiments, a remainder of the incident first wavelength of light can be transmitted across the first and second reflective type optical element 404 and/or 416 along with the transmission of the second wavelength of incident light. After passage through the second reflective type optical element 416, an optical signal can continue passage across an interface 420 into the right side of the optical connector 400 for continued transmission along an aligned optical path in a fourth optical fiber section 442 in the right side of the optical connector 400.

Optical signals have been described as being transmitted in one direction (i.e., left to right) in the embodiment of FIG. 4 for the purpose of clarity. However, optical signals can be transmitted in either direction by the lens arrangement illustrated. Moreover, optical signals carrying distinct information can be transmitted in both directions along the same optical fiber either alternately or simultaneously.

Figure 5:
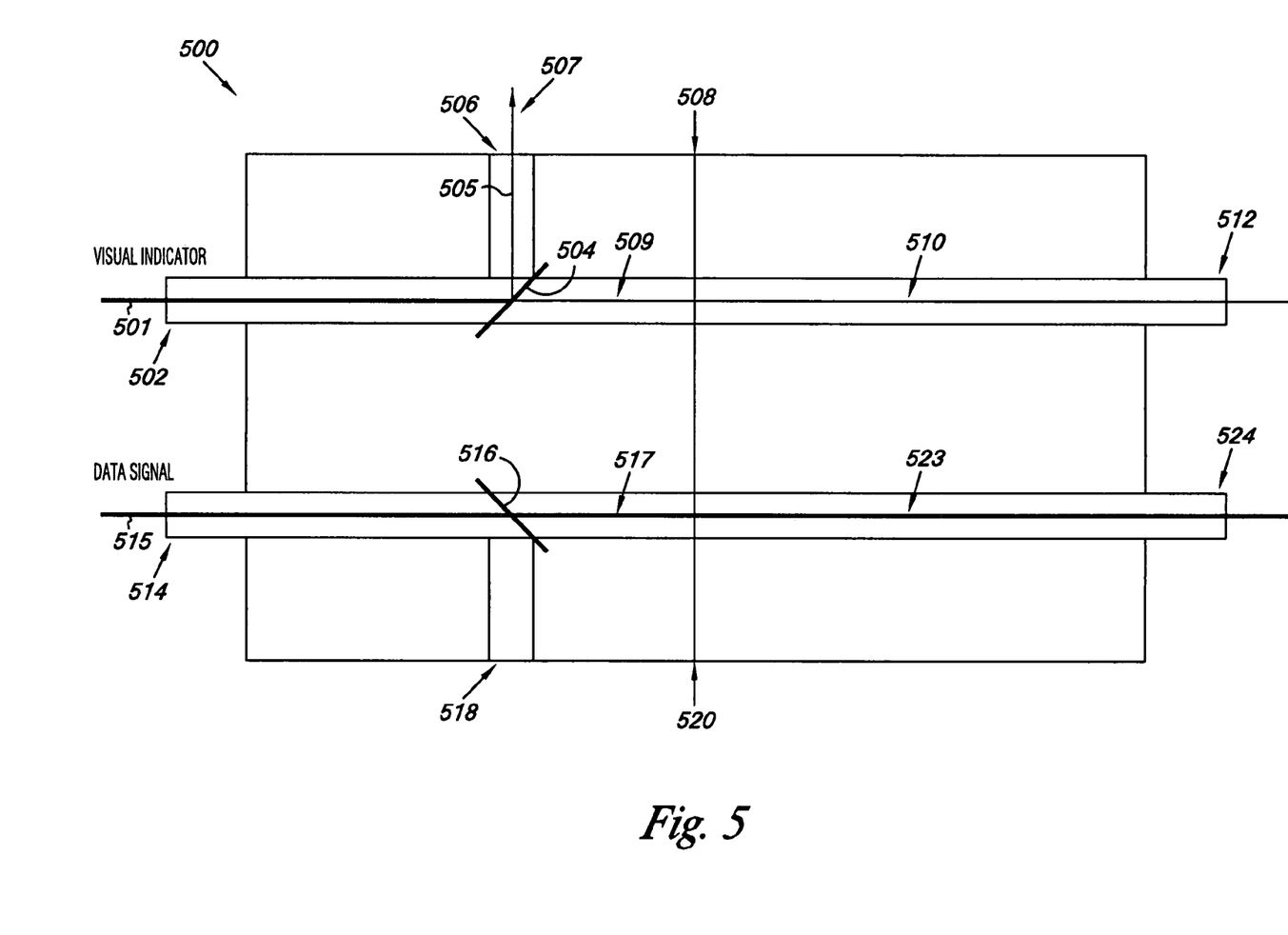
FIG. 5 is an illustration of operation of a reflective type optical connector in accordance with an embodiment of the present disclosure.

FIG. 5 is an illustration of operation of a reflective type optical connector in accordance with an embodiment of the present disclosure. In the embodiment illustrated in FIG. 5, an optical connector apparatus 500 is shown that is similar to the embodiment of the connector apparatus shown in FIG. 4. The connector 500 in the embodiment of FIG. 5 has a first visual optical signal 501 that is transmitted through a first visual indicator optical fiber section 502 toward a first reflective type optical element 504.

In this embodiment, the first optical signal 501 can come from a first light source emitting visible light as such was described previously. In the embodiment of FIG. 5, when the visible signal 501 transmitted through the visual indicator optical fiber section 502 reaches the first reflective type optical element 504, the visible signal 501 can be at least partially reflected 505 in a direction consistent with placement of a first optical window 506.

As shown in the embodiment of FIG. 5, at least a portion of the reflected visible signal 505 directed toward the first optical window 506 can pass through to the outside of the optical connector 500. The visible light 507 that has passed through the first optical window 506 can be detected outside the connector 500 by an operator and/or a photodetector.

A remainder of the visible light signal 509 that has not been reflected by the first reflective type optical element 504 can be transmitted and pass across an interface 508 between a left side and a right side of the connector 500. The remainder 509 can be transmitted as a diminished visual signal 510 on an aligned second visual indicator optical fiber section 512 along the optical pathway.

In the embodiment illustrated in FIG. 5, the optical connector apparatus 500 has a second optical signal 515 that is transmitted through a normal data signal optical fiber section 514 toward a second reflective type optical element 516. The second optical signal 515 can be comprised of light pulses conveying information (e.g., data) along the optical pathway. In this embodiment, the second optical signal 515 can come from a second light source emitting light, which in some embodiments can be nonvisible light having a wavelength or a range of wavelengths imperceptible by the human eye that is emitted by a laser, as described previously.

In the embodiment of FIG. 5, when the second signal 515 transmitted through the normal data signal optical fiber section 514 reaches the second reflective type optical element 516, the second signal 515 can be transmitted substantially undiminished 517 through the second reflective type optical element 516. As such, in the embodiment illustrated in FIG. 5, none of the incident second optical signal 515, which can be nonvisible light pulsed to encode information (e.g., data), is shown to be reflected and directed toward a second optical window 518, which would make the second signal 515 substantially undetectable through the second optical window 518. Hence, the substantially undiminished normal data signal 517 can progress through the interface 520 between the left and right sides of the connector 500. After traversing the interface 520, the substantially undiminished data signal 523 continues along the optical pathway.

The embodiment illustrated in FIG. 5 shows the visible first signal 501 and the normal data second signal 515 to be transmitted through two separate optical fibers 502, 514 for purposes of clarity. However, in some embodiments, the first and second signals can be transmitted as a combined signal over a single fiber optic pathway. The operation of the embodiments illustrated in FIGS. 3 and 5 shows an optical pathway with an optical emitter having a first light source that emits a first signal at a visible first wavelength and having a second light source that emits a second signal at a second wavelength for data transmission. An optical window is associated with the optical pathway that allows detection of the visible first wavelength while allowing substantially uninterrupted data transmission through the optical pathway using the second wavelength. A diverting structure (e.g., an expanded beam type optical connector and/or a reflective type optical element, as such were described previously) is embedded in the optical pathway to divert at least a portion of the visible first wavelength of the first signal through the optical window.

In various embodiments, the optical pathway includes a number of first and second engagement surfaces each joined by an optical connector positioned to allow for the transmission of light signals across a number of apertures between the number of first and second engagement surfaces. In various embodiments, the transmission of light signals across the apertures between the number of first and second engagement surfaces can be accomplished using an expanded beam type optical connector. In some embodiments, the expanded beam type optical connector can be a pair of ball lenses associated with each optical pathway.

In various embodiments, the diverting structure embedded in the optical pathway can be a lens structure to divert at least a portion of the first signal through an optical window. In some embodiments, a number of lens structures can be associated with a number of the optical connectors having optical windows associated with a number of first engagement surfaces and second engagement surfaces. The diversion of at least a portion of the visible wavelength of the first signal through the optical window can be accomplished in various embodiments by coating of at least a portion of the lens structure so as to divert a portion of the first signal.

In various embodiments, the diverting structure embedded in the optical pathway can be associated with a first optical window in a first transmission direction and a second optical window in a second transmission direction. In various embodiments, the optical pathway can include optical windows provided on at least one first engagement surface and at least one second engagement surface. Where there is more than one diverting structure embedded in the optical pathway each can be associated with at least one of a number of first engagement surfaces and second engagement surfaces in various embodiments.

The transmission of light signals across the number of first and second engagement surfaces can be accomplished with a reflective type optical element in the optical pathway for various embodiments, where the reflective type optical element includes a filter selected from a group including a reflective thin film filter, an absorptive thin film filter, and a wavelength dependent beam split filter, among others.

Figure 6:
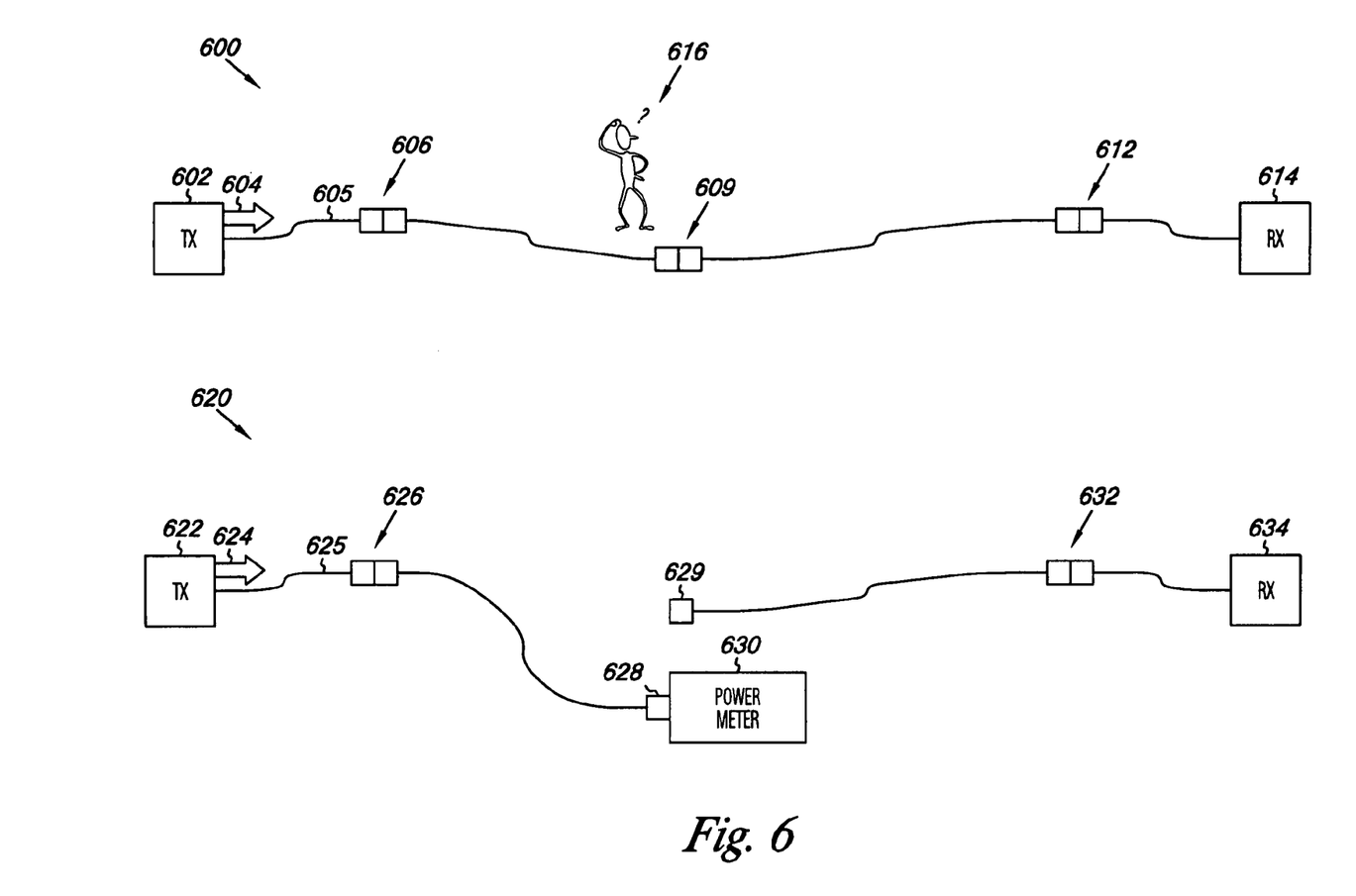
FIG. 6 is a schematic view of prior art fault detection in an optical pathway

FIG. 6 is a schematic view of prior art fault detection in an optical pathway. The scenario in the schematic view of FIG. 6 represents a fiber optic communication system 600. In a representative system 600, a transmitter 602 emits a signal encoded in to light 604 that is transmitted along a fiber 605 of a fiber optic pathway.

Commonly, fiber optic cables are manufactured in specified section lengths and, as such, lengthy fiber optic pathways typically require more than one section. To accommodate more than one section of fiber optic cable, connectors to connect one section to another can be implemented. In the scenario of the illustrated system 600, three connectors 606, 609, 612 are necessary to transmit the signal 604 from the transmitter 602 to a receiver 614.

Efficient transmission of signals in a fiber optic communication system is best accomplished with a fiber optic pathway that is intact. That is, disconnecting two sections of fiber optic cable interrupts communication thereon. Similarly, having a fault in the fiber optic pathway due to a break in a fiber optic cable, contaminated engagement surfaces in connectors, or some other cause interrupts communication. Prior to availability of a fiber optic transmission diagnostic apparatus, as disclosed in the present application, in a scenario where the fiber optic communication system 600 appears to be intact, a location of a fault interrupting transmission of information, or data, can be difficult to determine and create a puzzling problem for an operator 616 of the system.

The scenario in the schematic view at the bottom of FIG. 6 represents a fiber optic communication system 620 having a fault. The location of the fault in the system 620 is shown as being determined using an example of pre-existing technology. In the representative system 620, a transmitter 622 emits a signal encoded in to light 624 that is transmitted along a fiber 625 of a fiber optic pathway. There is a fault somewhere between the transmitter 622 and a receiver 634 in system 620 that interrupts communication between the two. The location of the fault can be anywhere between the transmitter 622 and the receiver 634.

In an attempt to locate a section of the fiber optic cable containing the fault, an operator will commonly disconnect previously attached connectors (e.g., 626, 632) to connect a power meter 630. The two sides of the connector 628, 629 shown by way of example in the middle of the optical pathway of system 620 have been disconnected so that the power meter 630 can be used to measure a presence or absence, and potentially a power level of a signal if present, of a light signal being transmitted from the transmitter 622.

Attempting to locate a fault as just described can be time consuming and require lengthy and demanding physical effort. Moreover, as shown in system 620, the location of a fault only can be determined as existing somewhere in a section in some situations. The approximate nature of fault location in system 620 is due to the power meter 630 measuring signals emitted by the transmitter 622 by disconnecting connectors (e.g., 628, 629) and connecting the power meter to the side of the connector closest to the transmitter (e.g., 628) in order to detect the presence or absence of a signal. In such a system 620, if the fault was due to a contaminated engagement surface on the distal side of the connector (e.g., 629) the power meter could only detect the fault by disconnecting connector 632 far downstream. Hence, using a power meter as just described often only provides a rough approximation of fault location and can preclude transmission of signals carrying information for undesirable lengths of time.

Figure 7:
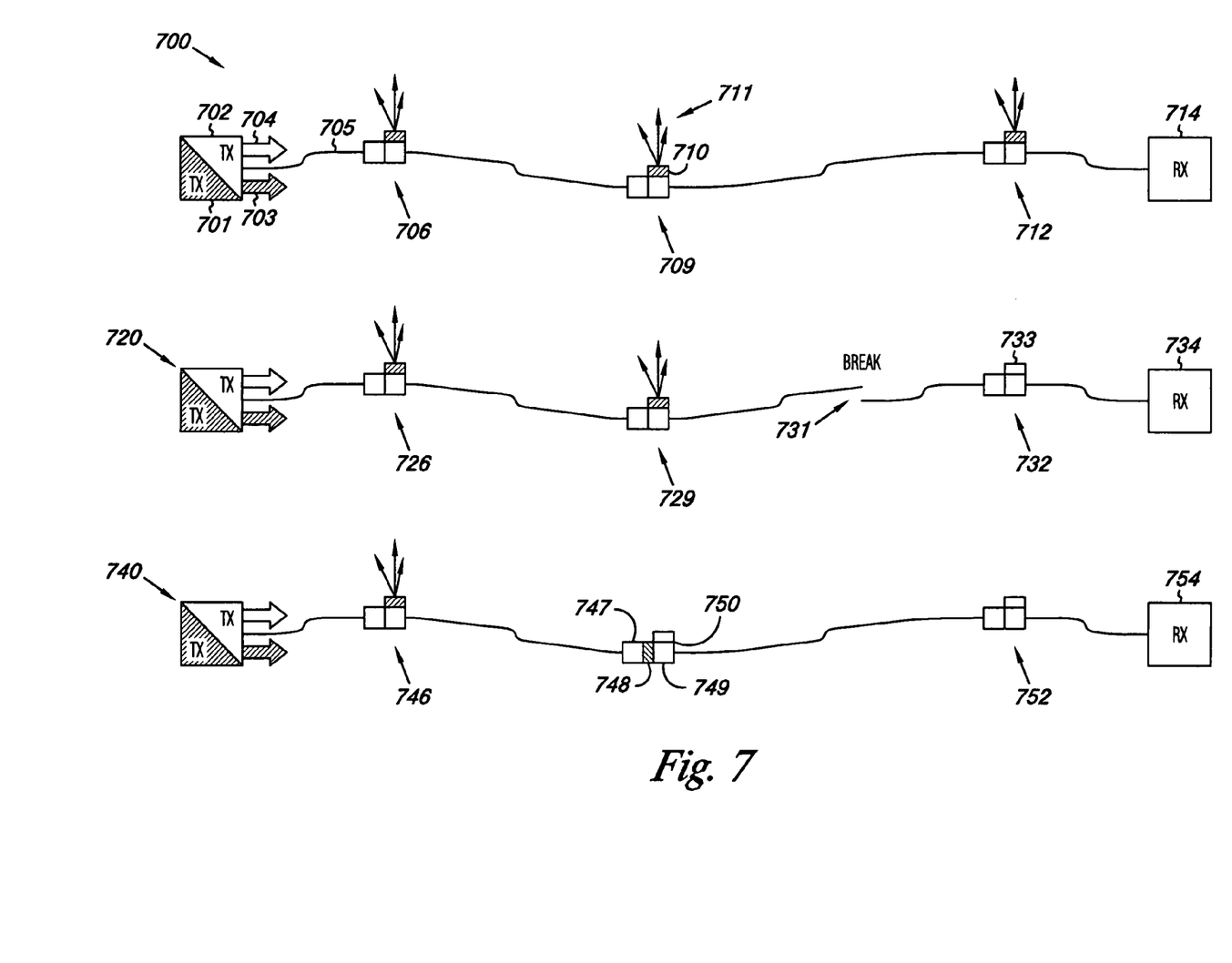
FIG. 7 is a schematic view of diagnostic fault detection and location in an optical pathway in accordance with an embodiment of the present disclosure.

FIG. 7 is a schematic view of diagnostic fault detection and location in an optical pathway in accordance with embodiments of the present disclosure. In the embodiment 700 shown in FIG. 7, a first light source 701 is shown that is a portion of a transmitter that can emit visible light for detection of a fault. Additionally, in embodiment 700, a second light source 702 is shown that is a portion of the transmitter that can emit light carrying a data signal. The first light source 701 can emit a first optical signal 703 and the second light source 702 can emit a second optical signal 704 that are transmitted to a fiber optic cable 705 of an optical pathway as an integrated signal.

As shown in the representative embodiment 700 of FIG. 7, the optical pathway 705 has three connectors 706, 709, 712 linking sections of the fiber optic cable before the integrated optical signal 703, 704 reaches a receiver 714. Each connector 706, 709, 712 has at least one optical window associated with at least one side of the connector. In the embodiment 700, the optical windows are shown as being associated with a right portion of each connector. For example, connector 709 has optical window 710 through which at least a portion of visible optical signal 703 is being emitted 711.

In the embodiment 700, the optical windows 706, 710, 712 are on the distal portions of the connectors relative to the first light source 701 and detection of visible light being emitted through the optical windows is indicative of intact and functioning fiber optic cable between the optical window and the transmitter 701. Moreover, in contrast to use of a power meter as shown in embodiment 620 of FIG. 6, detection of visible light through an optical window in the embodiment 700 can indicate that both sides of a connector are intact and functioning. Determining such functionality of the fiber optic cable and both sides of a connector can be performed while leaving all connectors connected to allow uninterrupted transmission of data signals 704.

The embodiment 700 of FIG. 7 shows a first optical signal and a second optical signal being transmitted as an integrated signal from a second transmitter 720 to a second receiver 734 through an optical pathway as just described. Visible light being emitted from connectors 726 and 729 can indicate an intact and functional pathway between the transmitter 720 and the most distal connector (i.e., connector 729).

To the right of connector 729, a break 731 in the optical pathway interrupts transmission of the first optical signal 703 and the second optical signal 704 before they can reach connector 732. A fault in the optical pathway, represented by the break 731, is indicated by lack of detectable visible light being emitted from optical window 733 associated with connector 732. Because the optical window associated with connector 729 does emit visible light and optical window 733 associated with the right side of connector 732 displays no detectable visible light, a fault such as break 731 can be localized as being in the section of fiber optic cable to the right of connector 729 and to the left of connector 732. Alternatively, the fault in the embodiment shown can be in the left portion of the connector 732.

The embodiment 700 of FIG. 7 shows a first optical signal and a second optical signal being transmitted as an integrated signal from a third transmitter 740 to a third receiver 754 through an optical pathway as previously described. Visible light being emitted from connector 746 can indicate an intact and functional pathway between the transmitter 740 and the right side portion of connector 746.

To the right of connector 746, a left side of the next connector 747 has contamination 748 between the left side 747 and a right side of the connector 749. The contamination 748 in the optical pathway interrupts transmission of the first optical signal 703 and the second optical signal 704 before they can reach the right side of the connector 749. A fault in the optical pathway, represented by the contamination 748, is indicated by lack of detectable visible light being emitted from optical window 750 associated with the right side of the connector 749. Because the optical window associated with the right side of the connector 746 does emit visible light and optical window 750 associated with the right side of the connector 749 displays no detectable visible light, a fault such as contamination 748 can be localized as being in the section of fiber optic cable to the right of connector 746 and to the left of the right side of the connector 749. Alternatively, the fault in the embodiment shown can be in the left portion of the connector 747.

More accurate localization of faults can be enabled by association of an optical window with each side of a connector. For example, if the optical pathway of the second transmitter 720 had an optical window associated with the left side of the connector 732 that also was not emitting visible light, it could be determined that the fault, in this embodiment break 731, was located between connectors 729 and 732. That is, if the fault was a result of contamination between the left and right side of connector 732, the optical window of the left side would emit detectable visible light and the optical window on the right side of connector 732 would not emit light.

Such an example of contamination between a left and right side of a connector is shown with regard to the integrated optical signal emitted by the third transmitter 740. If the left side of the optical connector 747 had an optical window emitting visible light and the optical window 750 of the right side 749 emitted no light, it can be determined that the fault can result from contamination 748 of one or both engagement surfaces between the left side 747 and the right side 749.

Figure 8:
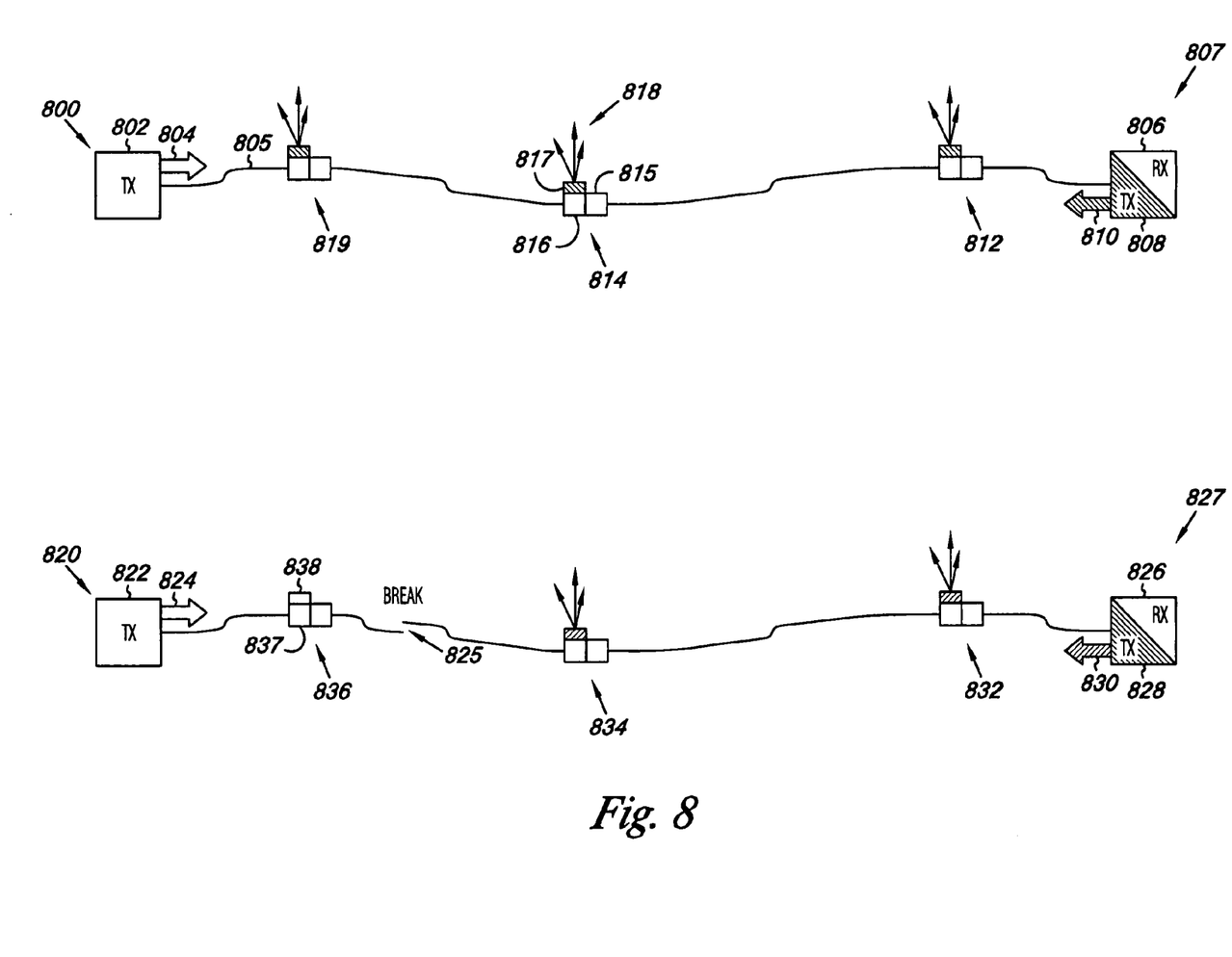
FIG. 8 is another schematic view of diagnostic fault detection and location in an optical pathway in accordance with an embodiment of the present disclosure.

FIG. 8 is another schematic view of diagnostic fault detection and location in an optical pathway in accordance with embodiments of the present disclosure. An embodiment 800 shown in FIG. 8 illustrates a means 802 for transmitting an integrated signal 804 over a fiber optic cable 805, where the integrated signal includes a first optical signal and a second optical signal, the first optical signal being a visible signal and the second optical signal being a data signal. The embodiment 800 of FIG. 8 includes a receiver 806 for receiving the integrated signal by an optical receiver. An integrated unit 807 can include a transmitter 808 in some embodiments. In some embodiments, the transmitter 808 can emit a third optical signal relative to the first two optical signals described previously as combining to form the integrated signal.

The integrated unit 807 includes a converter (not shown) for converting the second optical signal to an electronic signal, where a reduction of the electronic signal indicates a fault in transmission between the optical transmitter 802 and the optical receiver 806. The converter, or a logic component associate with the integrated unit 807, can determine an intensity level of the second optical signal (i.e., the data signal) relative to previously received second optical signals. The embodiment 800 includes, as previously described, a means for diagnosing a location of the fault through one or more optical windows for detection of the first optical signal.

The receiver for receiving the integrated signal, or an associated component, can include a means for discriminating the first optical signal, which can be the visible signal for fault detection, from the second optical signal, which can be the data signal. As described previously, the embodiment 800 includes a means for diagnosing a location of a fault through one or more optical windows for detection of the first optical signal.

The embodiment 800 can include an integrated unit 807 having a transmitter 808 for transmitting a third optical signal 810 over the fiber optic cable, where the third optical signal indicates that the second optical signal has been converted to an electronic signal. Sending the third optical signal indicating an intact and functional optical pathway can be dependent upon measurement of the power level of the second optical signal showing, for example, that the power level is adequate for conversion to an electronic signal and/or that the power level is in a predetermined range of previously converted second signals.

In various embodiments, the third optical signal 810 can be transmitted in a first visible wavelength when converting the electronic signal indicates an absence of a fault in transmission between the optical transmitter 802 and the optical receiver 806. In some embodiments, absence of a fault is indicated by creating one or more optical windows for detection of the third optical signal in the first visible wavelength. For example, in embodiment 800, an intact and functional optical pathway transmitting a data signal that has been converted to adequate level is shown by the connectors 812, 814, 819 emitting from optical windows a visible wavelength of a first wavelength. In particular, connector 814 has a right side 815 and a left side 816. An optical window 817 associated with the left side 816 can emit the third optical signal 818 in a first visible wavelength when the second transmitter 808 sends signal 810.

An embodiment 820 of FIG. 8 illustrates determination of a location of a fault in an optical pathway. The transmitter 822 of an integrated signal 824 can attempt to send a second signal carrying information to an optical receiver 826 in an integrated unit 827 with a transmitter 828 of a fourth optical signal 830. Although a break 825 in the optical pathway can prevent transmission of information by the second optical signal, the embodiment 820 can indicate to the integrated unit 827 that transmission of information by a second signal has been attempted.

In various embodiments, the embodiment of 820 can include a receiver 826 for receiving the integrated signal, or an associated component, that includes a means for transmitting a fourth optical signal over the fiber optic cable, where the fourth optical signal indicates that the second optical signal has not been converted to the electronic signal, thereby indicating that a fault (e.g., the break 825) exists in the optical pathway. In some embodiments, the fourth optical signal can be transmitted in a second visible wavelength.

In various embodiments, the means for diagnosing a location of the fault includes providing one or more optical windows for detection of the fourth optical signal in the second visible wavelength. For example, in embodiment 820 the fourth optical signal indicating a fault in the optical pathway can be emitted as a second visible wavelength through optical windows in connectors 832 and 834 because the break 825 is further from the third transmitter 828. However, because the break 825 is closer to the third transmitter 828 than the connector 836 the fourth optical signal 830 emitted in the second visible wavelength is not emitted from the optical window 838 associated with the left side of the connector 836. As such, the fault can be determined to be between connector 834 and connector 836.

As previously described, each side of a connector can have one or more optical windows. If connector 836 of embodiment 820 had an optical window associated with the right side of connector 836, a type and location of a fault could be determined more closely. As described with regard to embodiment 740 of FIG. 7, if a portion of a first optical signal was visible through an optical window on the right side of connector 836 and not through an optical window on the left side, contamination between the engagement surfaces of the two sides of the connector could be determined rather than a break in the fiber optic cable.

Figure 9:
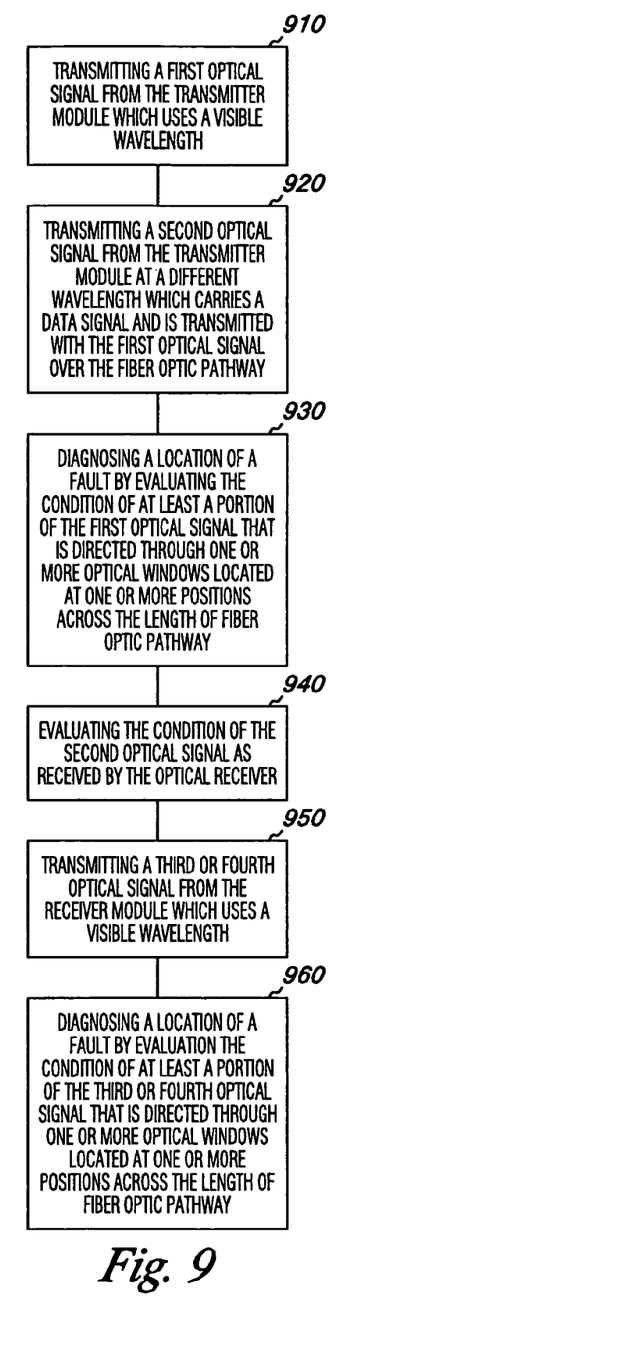
FIG. 9 is a block diagram illustrating a method for diagnostic fault detection and location in an optical pathway in accordance with an embodiment of the present disclosure.

FIG. 9 is a block diagram illustrating a method for diagnostic fault detection and location in an optical pathway in accordance with embodiments of the present disclosure. Block 910 of the embodiment of FIG. 9 includes transmitting a first optical signal from the transmitter module which uses a visible wavelength.

Block 920 includes transmitting a second optical signal from the transmitter module at a different wavelength which carries a data signal and is transmitted with the first optical signal over the fiber optic pathway.

Additionally, block 930 of FIG. 9 includes diagnosing a location of a fault by evaluating the condition of at least a portion of the first optical signal that is directed through one or more optical windows located at one or more positions across the length of fiber optic pathway.

In some embodiments, as illustrated in Block 940, an embodiment can include evaluating the condition of the second optical signal as received by the optical receiver. At block 950, the embodiment of FIG. 9 includes transmitting a third or fourth optical signal from the receiver module which uses a visible wavelength. Embodiments can also include diagnosing a location of a fault by evaluation of the condition of at least a portion of the third or fourth optical signal that is directed through one or more optical windows located at one or more positions across the length of fiber optic pathway, as illustrated at block 960 in the embodiment of FIG. 9. In some embodiments, evaluating the condition of the first optical signal includes detecting an intensity of the first optical signal through one or more optical windows. In some embodiments, evaluating the condition of the first optical signal through one or more optical windows includes using one or more photodetectors for detecting one or more optical signal characteristics. In various embodiments, evaluating the condition of the second optical signal can include detecting an intensity of the second optical signal, the clarity of the signal, or other characteristics relevant to transmission of information.

In various embodiments, diagnosing the location of a fault can include using a logic component for diagnosing an approximate location of a fault by evaluating one or more electronic signals converted from at least one of the first optical signal and the second optical signal. In some embodiments, using the logic component for diagnosing an approximate location of a fault includes transmitting the approximate location to a remote device.

In such embodiments, the information obtained by the logic component can include, for example, whether light has contacted the photodetector surface, the intensity of the light, the location of the contact, and other such information that may be useful for providing functionality to the fiber optical system and/or network.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the invention includes various other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. An apparatus for indicating a fault location along a fiber optic path, comprising:

a first light source that emits a first signal at a visible wavelength for fault detection;

a second light source that emits a second signal at a nonvisible wavelength for data transmission, wherein the first signal and the second signal are transmitted as a combined signal over the fiber optic path;

a receiver having a photodetector that converts the second signal from the nonvisible wavelength to an electrical signal; and a diverting structure embedded in the fiber optic path to divert at least a portion of the visible wavelength of the first signal through an optical window while allowing undiminished data transmission through the fiber optic path using the nonvisible wavelength;

wherein the diverting structure embedded in the fiber optic path is a lens structure to divert at least the portion of the first signal through the optical window.

2. The apparatus of claim 1, wherein a transmitter produces a combined signal including the first signal and the second signal.

3. The apparatus of claim 1, wherein the receiver includes a filter to discriminate the first signal from the second signal prior to reception of the second signal by the photodetector.

4. The apparatus of claim 3, wherein the filter is selected from a group including a reflective thin film filter, an absorptive thin film filter, and a wavelength dependent beam split filter.

5. The apparatus of claim 1, wherein the first light source is transmitted intermittently.

6. The apparatus of claim 1, wherein the fiber optic path includes a multimode fiber for transmitting the first signal and the second signal.

7. A fiber optic transmission diagnostic apparatus, comprising:

means for transmitting an integrated signal over a fiber optic cable, wherein the integrated signal includes a first optical signal and a second optical signal, the first optical signal being a visible signal and the second optical signal being a data signal;

a receiver for receiving the integrated signal by an optical receiver;

a converter for converting the second optical signal to an electronic signal, wherein a reduction of the electronic signal indicates a fault in transmission between the optical transmitter and the optical receiver;

a number of diverting structures embedded in the fiber optic cable pathway to divert at least a portion of a visible wavelength of the first optical signal through one or more optical windows while allowing undiminished data transmission through the fiber optic cable pathway using a wavelength of the second optical signal, wherein the diverting structure embedded in the fiber optic cable pathway is a lens structure to divert at least the portion of the first optical signal through the one or more optical windows; and means for diagnosing a location of the fault through the one or more optical windows for detection of the first optical signal.

8. The fiber optic transmission diagnostic apparatus of claim 7, wherein the one or more optical windows allow emission of at least a part of the first optical signal from the fiber optic cable to diagnose the location of the fault.

9. The fiber optic transmission diagnostic apparatus of claim 7, wherein the receiver for receiving the integrated signal includes a means for discriminating the first optical signal from the second optical signal.

10. The fiber optic transmission diagnostic apparatus of claim 7, wherein the receiver includes a transmitter for transmitting a third optical signal over the fiber optic cable, wherein the third optical signal indicates that the second optical signal has been converted to an electronic signal.

11. The fiber optic transmission diagnostic apparatus of claim 10, wherein the third optical signal is transmitted in a first visible wavelength.

12. The fiber optic transmission diagnostic apparatus of claim 11, wherein the third optical signal indicates an absence of a fault in transmission between the optical transmitter and the optical receiver.

13. The fiber optic transmission diagnostic apparatus of claim 12, wherein the absence of a fault is indicated by creating one or more optical windows for detection of the third optical signal in the first visible wavelength.

14. The fiber optic transmission diagnostic apparatus of claim 13, wherein the receiver for receiving the integrated signal includes a means for transmitting a fourth optical signal over the fiber optic cable, wherein the fourth optical signal indicates that the second optical signal has not been converted to the electronic signal.

15. The fiber optic transmission diagnostic apparatus of claim 14, wherein the fourth optical signal is transmitted in a second visible wavelength.

16. The fiber optic transmission diagnostic apparatus of claim 15, wherein the means for diagnosing a location of the fault includes providing one or more optical windows for detection of the fourth optical signal in the second visible wavelength.

17. An optical pathway, comprising:

an optical emitter having a first light source that emits a first signal at a visible first wavelength and having a second light source that emits a second signal at a second wavelength for data transmission;

an optical window associated with the optical pathway that allows detection of the visible first wavelength; and a diverting structure embedded in the optical pathway to divert at least a portion of the visible first wavelength of the first signal through the optical window while allowing undiminished data transmission through the optical pathway using the second wavelength;

wherein the diverting structure embedded in the optical pathway is a lens structure to divert at least the portion of the first signal through the optical window.

18. The optical pathway of claim 17, wherein the optical pathway includes a number of first and second engagement surfaces each joined by an optical connector positioned to allow for the transmission of light signals across a number of apertures between the number of first and second engagement surfaces.

19. The optical pathway of claim 18, wherein the optical pathway includes optical windows provided on at least one first engagement surface and at least one second engagement surface.

20. The optical pathway of claim 18, wherein the transmission of light signals across the apertures between the number of first and second engagement surfaces is accomplished using an expanded beam type optical connector.

21. The optical pathway of claim 20, wherein the expanded beam type optical connector is a pair of ball lenses associated with each optical pathway.

22. The optical pathway of claim 17, wherein there is more than one diverting structure embedded in the optical pathway that are each associated with at least one of a number of first engagement surfaces and second engagement surfaces.

23. The optical pathway of claim 17, wherein the diverting structure embedded in the optical pathway is associated with a first optical window in a first transmission direction and a second optical window in a second transmission direction.

24. The optical pathway of claim 17, wherein the diversion of at least a portion of the visible wavelength of the first signal through the optical window is accomplished by coating of at least a portion of the lens structure so as to divert a portion of the first signal.

25. The optical pathway of claim 17, wherein the optical pathway includes a number of lens structures associated with a number of the optical connectors having optical windows associated with a number of first engagement surfaces and second engagement surfaces.

26. A method for diagnosing an optical signal, comprising:
transmitting a first optical signal from a transmitter module which uses a visible wavelength;
transmitting a second optical signal from the transmitter module at a different wavelength which carries a data signal and is transmitted with the first optical signal over a fiber optic pathway;
embedding a number of diverting structures in the fiber optic pathway to divert at least a portion of the visible wavelength of the first optical signal through one or more optical windows while allowing undiminished data transmission through the fiber optic pathway using the different wavelength of the second optical signal, wherein the diverting structure in the fiber optic pathway is a lens structure for diverting at least the portion of the first optical signal through the one or more optical windows; and
diagnosing a location of a fault by evaluating a condition of at least the portion of the first optical signal that is directed through the one or more optical windows located at one or more positions across a length of the fiber optic pathway.

27. The method of claim 26, wherein the method includes:
evaluating a condition of the second optical signal as received by an optical receiver;
transmitting a third or fourth optical signal from a receiver module which uses a visible wavelength; and
diagnosing a location of a fault by evaluation of a condition of at least a portion of the third or fourth optical signal that is directed through one or more optical windows located at one or more positions across the length of fiber optic pathway.

28. The method of claim 27, wherein evaluating the condition of the second optical signal includes detecting an intensity of the second optical signal.

29. The method of claim 26, wherein evaluating the condition of the first optical signal includes detecting an intensity of the first optical signal through the one or more optical windows.

30. The method of claim 26, wherein evaluating the condition of the first optical signal through the one or more optical windows includes using one or more photodetectors for detecting one or more optical signal characteristics.

31. The method of claim 26, wherein diagnosing the location of a fault includes using a logic component for diagnosing an approximate location of the fault by evaluating one or more electronic signals converted from at least one of the first optical signal and the second optical signal.

32. The method of claim 31, wherein using the logic component for diagnosing the approximate location of the fault includes transmitting the approximate location to a remote device.

* * * * *